United States Patent

Okano

[11] 4,264,151
[45] Apr. 28, 1981

[54] OPTICAL ADAPTOR FOR MOVIE AND TELEVISION CAMERAS

[75] Inventor: Yukio Okano, Izumi, Japan

[73] Assignee: Minolta Camera Kabushiki Kaisha, Osaka, Japan

[21] Appl. No.: 959,077

[22] Filed: Nov. 9, 1978

[30] Foreign Application Priority Data

Nov. 22, 1977 [JP] Japan .................. 52/140445

[51] Int. Cl.³ ............................................. G02B 15/02
[52] U.S. Cl. ..................................... 350/422; 350/479
[58] Field of Search .................... 350/183, 230; 354/79, 354/159; 352/79

[56] References Cited

U.S. PATENT DOCUMENTS

| | | | |
|---|---|---|---|
| 3,441,338 | 4/1969 | Johnson et al. ........... | 350/183 |
| 3,981,021 | 9/1976 | Beecher ................. | 354/79 |
| 4,154,508 | 5/1977 | Nakamura ............... | 350/183 |

FOREIGN PATENT DOCUMENTS 51-151537 12/1976 Japan .
52-1130 1/1977 Japan .

Primary Examiner—Conrad J. Clark
Attorney, Agent, or Firm—Jackson, Jones & Price

[57] ABSTRACT

An optical adaptor is provided to permit objective lenses designated for a certain image format to be used on optical devices having a smaller image format. Thus, 35 mm single lens reflex camera lenses can be mounted on a cinematographic camera and a T.V. camera. The optical adaptor includes a pair of mounts for attachment respectively to the objective lens and to the optical device. Mounted within the adaptor housing is a positive refractive lens system capable of shortening the focal length and increasing the aperture ratio of the objective lens system. The lens system satisfies the condition that the magnification, $\beta$, is equal to or less than 1 and the refractive power of a negative element lens $\Psi_1$ to that of a positive element lens, $\Psi_2$, in the lens system, satisfies the following;

$$(4/\beta) - 4.5 \leq |\Psi_2/\Psi_1| \leq (4/\beta) - 3$$

9 Claims, 10 Drawing Figures

I II

I II

OPTICAL ADAPTOR FOR MOVIE AND TELEVISION CAMERAS

BACKGROUND OF THE INVENTION

1. Field of the Invention

The present invention is directed to an optical adaptor that permits the conversion of objective lenses designed for a certain image format to be utilized on optical devices having a smaller effective image format, more particularly the optical adaptor permits the use of exchangeable objective lens of a 35 mm single lens reflex camera on a T.V. camera and/or a motion picture camera.

2. Description of the Prior Art

Various forms of optical adaptors and converters are broadly known in the prior art for example, as disclosed in the Japanese Utility Model Publication No. 52,1130 and Japanese Patent Publication No. 51-151537. These devices have permitted objective lens to be attached to an optical device having a different mount and also to adjust the axial air space between the optical device and the objective lens.

Generally, the transmitted image will have a limited field of view as compared to the original capacity of the objective lens when used in the mode where it was originally intended to be utilized. Thus, frequently an objective lens system would be converted into a telephoto lens when used with an adaptor for an optical device having a smaller image format.

Particularly in the movie and video field, prior art limitations have restrained the use of objective lens systems, such as have been developed for 35 mm single lens reflex cameras, to be converted for use with either a T.V. or movie camera.

Of general interest is a binocular adaptor that has been designed for connecting a camera, having a recess lens, with a binocular device as shown in U.S. Pat. No. 3,981,021. In this regard, a lens system is provided in the adaptor housing having a negative refractive power to permit connection with a small pocket camera.

Finally, it has been known in the prior art to utilize rear converters to convert the focal distance of an objective lens system to a desired distance. These conventional rear converters, however, do not permit the utilization of an objective lens of a given image format size for utilization on a smaller image format optical device. These rear converters are intended for use on objective lenses and optical devices having identical image formats.

Accordingly, the prior art in the movie and video industry has not realized the full potential of using 35 mm objective lenses on movie and video cameras.

SUMMARY OF THE INVENTION

It is an object of the present invention to provide an optical adaptor which permits objective lenses designed for a large image format to be used on an optical device such as a video or motion picture camera having a smaller image format while maintaining the inherent performance qualities of the objective lenses including the field of view.

It is another object of the present invention to provide an optical adaptor which increases the aperture ratio of the objective lens when it is converted for use on a smaller image format optical device.

The optical adaptor of the present invention is provided to permit objective lenses, such as 35 mm single lens reflex camera lenses, to be utilized on a smaller image format optical device, such as a movie picture camera and a T.V. camera. The optical adaptor includes a pair of mounts for attachment respectively to the objective lens and to the optical device. Mounted within the adaptor housing is a positive refractive lens system capable of shortening the focal length and increasing the aperture ratio of the objective lens system. The lens system satisfies the condition that the magnification, $\beta$ is equal to or less than 1 and the refractive power of a negative element lens $\Psi_1$ to that of a positive elements lens, $\Psi_2$, in the lens system, satisfies the following;

$$(4/\beta) - 4.5 \leq |\Psi_2/\Psi_1| \leq (4/\beta) - 3$$

The objects and features of the present invention which are believed to be novel are set forth with particularity in the apended claims. The present invention, both as to its organization and manner of operation, together with further objects and advantages thereof, may best be understood by reference to the following description, taken in connection with the accompanying drawings.

DESCRIPTION OF THE PREFERRED EMBODIMENTS

The following description is provided to enable any person skilled in the movie and television industry to make and use the invention and sets forth the best modes contemplated by the inventor of carrying out his invention. Various modifications, however, will remain readily apparent to those skilled in the above arts, since the generic principals of the present invention have been defined herein specifically to provide a relatively simple and easily manufactured optical adaptor.

Figure 1:
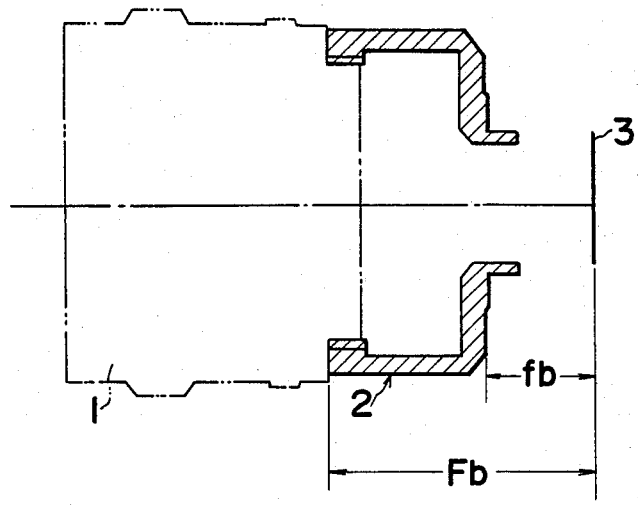
FIG. 1 is a partial sectional diagrammatic view of a prior art optical adaptor.

Referring to FIG. 1, a prior art adaptor is disclosed in a cross-sectional configuration juxtaposed adjacent a phantomed line disclosure of an objective lens system 1. This optical adaptor not only permits the objective lens 1 to be attached to an optical device having a different mounting coupler (not shown) from the mount of the objective lens, but also permits an adjustment of the axial air space corresponding to the difference (Fb−fb) between the design focal distance of the objective lens and the image receiving plane or focal plane 3, of the optical device. Fb is the distance between the flange of the objective lens 1 and the focal plane 3 of the optical device, while the distance fb, is governed by the physical construction of the body of the optical device. Because the image format or effective picture size of the objective lens 1, is larger than the image format or picture size of the optical device, in which it is desired to mount the objective lens, the prior art has, with use of an adaptor, only utilize the image near the optical axis of the objective lens. Thus, if it was desired to use an objective lens system having a large picture size with an optical device having a small picture size, the objective lens with a normal angle of view will be converted into a telephoto lens for the optical device having a smaller picture size. As a result, any objective lens that would be designed to be a so-called wide angle lens when used with an adaptor on an optical device having a small picture size will result in a reduced performance capability with a sacrifice in image taking capabilities.

The present invention provides a unique optical adaptor that permits objective lenses, for example, of a 35 mm single lens reflex camera type to be used with a small picture size camera such as a movie or video camera while maintaining the inherent performance qualities that were designed into the objective lens system and further providing an increased aperture ratio.

Figure 2:
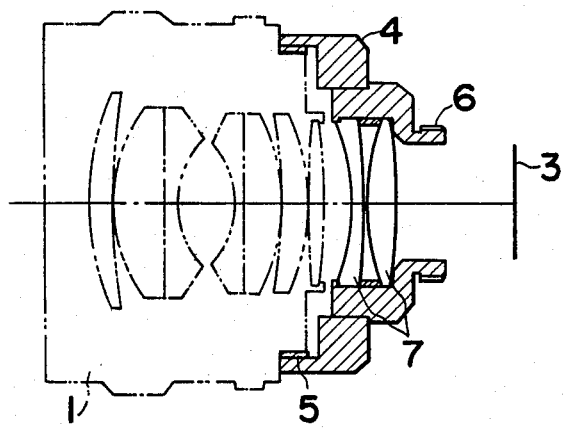
FIG. 2 is a partial sectional diagrammatic view of an optical adaptor of the present invention.

Referring to FIG. 2, a first embodiment of the optical adaptor 7, is disclosed juxtaposed in relationship to a phantomed objective lens system 1. The adaptor lens system 7 includes a first negative element lens concave to the object side and a second positive element lens convex to the object side. The overall refractive power of these lens elements is positive.

A first mounting member 5 is provided for attachment to the coupling or mounting mechanism of the objective lens 1, while a second mounting member 6 is specifically designed for coupling to an optical device, (not shown) having a focal plane 3. As disclosed in FIG. 2, the configuration of the two mounting members are dissimilar because quite frequently optical devices having different picture sizes will utilize dissimilar types of mounting. It should be understood, however, that both the mounting member 5 and the mounting member 6 could have the same configuration within the scope of the present invention.

The optical adaptor 4 has a specific relay magnification, $\beta$, which will be equal to or below 1 and will shorten the effective focal length of the objective lens while at the same time reducing its F-number. Thus, the optical adaptor 4 of the present invention not only permits an effective utilization of the design angle of view of the objective lens in the optical device, but also provides a resulting lens system with an increased aperture ratio.

Figure 3:
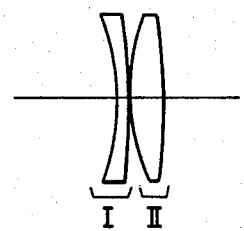
FIG. 3 is a sectional schematic view of an adaptor lens system capable of being utilized in the embodiment of FIG. 2.

Referring to FIG. 3, the adaptor optical system is disclosed as two separate lens groups. The terminology lens group is utilized simply to recognize the fact that more than one lens could be utilized to perform the same function as a single lens, as is readily understood by an optical designer, and that the term lens group is generic to a single lens element or a plurality of lens elements designed to serve the same optical function. Thus, the first lens group I is a single lens element of a negative refractive power and the rear second lens group II, is a single lens element of a positive refractive power. This particular arrangement is intended to provide a comparatively long back focal distance and hence sufficient air space for installation of an optical low pass filter, conversion filter for color, temperature, etc., that is sometimes required in the movie and video industry. Thus, these filters can be provided between the second lens group II and the focal plane when mounting the objective lens on an optical device such as a single tube or double tube color television camera. It should be readily understood that these optical low pass filters and/or other elements known in these industries may optionally be installed either on the object side of the first lens group I or inside the optical adaptor.

As known by optical designers, an objective lens must be carefully corrected for aberrations and when designed to be used alone a complete aberration balance is provided in the lens elements of the objective lens system. Therefore, unless the adaptor lens system 7 built into the adaptor 4 has been completely corrected for aberrations with respect to an object point behind the lens system, the overall aberration balance would be disturbed when the optical adaptor 4 is coupled with the objective lens 1. As will be apparent from FIG. 3, the front surface of the first lens group I of the lens assembly 7 is concave to the object side, while the front surface of the second lens group II is convex to the object side. These configurations are necessary for the proper correction of the lens system for comatic aberration. More particularly, it has been found that when the first lens group I of the double group lens assembly has a negative element concave to the object side with a refractive power $\Psi_1$, and the second group II of the lens assembly has a positive element convex to the object side with a refractive power $\Psi_2$, it is necessary that the following condition be satisfied to practice the present invention;

$$(4/\beta)-4.5 \leq |\Psi_2/\Psi_1| \leq (4/\beta)-3 \tag{1}$$

$\beta$ is the relay magnification of the adaptor lens system and satisfies the following condition;

$$\beta \leq 1 \tag{2}$$

It is necessary to adhere to the conditions of equation (1) in order to obtain a balanced correction for various aberrations. The second condition insures that the lens assembly within the adaptor will have a positive overall refractive power.

While, with regard to a monochromatic transmission, it is only necessary that the above two equations be met, it is further desirable in order to correct the system for chromatic aberration, that the average value of the Abbe number of the first lens group I be smaller than or equal to, the average value of the Abbe number of the second lens group II.

It should be understood that, for the purpose of providing a performance assessment of these embodiments, a lens system having a focal length of f=100, an F-number of $F_{NO}=1.4$ and an angle of view of $2\omega=46°$ is used as the objective lens system. It should also be understood that this particular objective lens system has been corrected for aberrations up to an image height of Y'=42.4. The following Table 1 provides the optical parameters of the reference objective lens system;

TABLE 1

Objective Lens System
$f = 100 \quad 2\omega = 46° \quad F = 1.4$

| Radius of Curvature | Axial Distance | Refractive Index | Abbe Number |
|---|---|---|---|
| $r_1 = 85.953$ | | | |
| | $d_1 = 7.427$ | $n_1 = 1.80741$ | $\nu_1 = 31.6$ |
| $r_2 = 264.66$ | | | |
| | $d_2 = 0.608$ | | |
| $r_3 = 49.684$ | | | |
| | $d_3 = 16.358$ | $n_2 = 1.689$ | $\nu_2 = 49.2$ |
| $r_4 = -5214.5$ | | | |
| | $d_4 = 3.916$ | $n_3 = 1.70055$ | $\nu_3 = 30.1$ |
| $r_5 = 30.864$ | | | |
| | $d_5 = 27.761$ | | |
| $r_6 = -31.646$ | | | |
| | $d_6 = 2.783$ | $n_4 = 1.74$ | $\nu_4 = 28.3$ |
| $r_7 = \infty$ | | | |
| | $d_7 = 11.931$ | $n_5 = 1.788$ | $\nu_5 = 45.7$ |
| $r_8 = -56.734$ | | | |
| | $d_8 = 0.293$ | | |
| $r_9 = -176.34$ | | | |
| | $d_9 = 8.627$ | $n_6 = 1.765$ | $\nu_6 = 46.3$ |
| $r_{10} = -57.207$ | | | |
| | $d_{10} = 0.303$ | | |
| $r_{11} = 426.44$ | | | |
| | $d_{11} = 5.201$ | $n_7 = 1.72$ | $\nu_7 = 50.2$ |
| $r_{12} = -159.93$ | | | |

The first embodiment is described in Table 2. It is to be understood that $d_0$ represents the axial distance between the rearmost surface $r_{12}$ of the objective lens and the surface $r_{c1}$ of this embodiment when the adaptor has been mounted on the objective lens.

TABLE 2

Embodiment 1 ($\beta = 0.7$)

| | Radius of Curvature | Axial Distance | Refractive Index | Abbe Number |
|---|---|---|---|---|
| | | $d_0 = 9.1$ | | |
| I | $r_{c1} = -74.791$ | | | |
| | | $d_{c1} = 3.89$ | $n_{c1} = 1.70055$ | $\nu_{c1} = 30.1$ |
| | $r_{c2} = -248.45$ | | | |
| | | $d_{c2} = 0.39$ | | |
| II | $r_{c3} = 74.775$ | | | |
| | | $d_{c3} = 10.69$ | $n_{c2} = 1.713$ | $\nu_{c2} = 53.9$ |
| | $r_{c4} = -153.83$ | | | |

Figure 4:
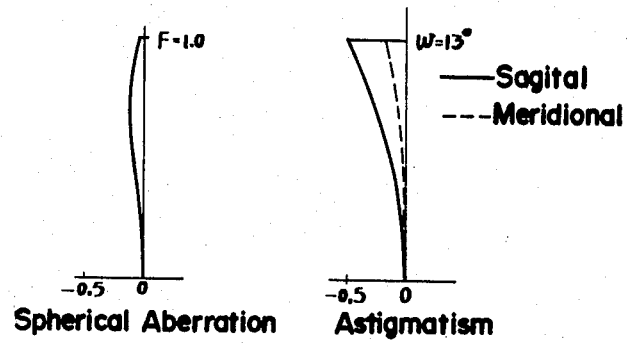
FIG. 4 is a plot of the spherical aberration and astigmatism of the lens system of FIG. 3.

The above embodiment 1 corresponds to the construction depicted in FIG. 3, wherein the first lens group consists of a negative meniscus lens and the second lens group consists of a positive biconvex lens. FIG. 4 shows the aberration diagram of the combination of the objective lens of Table 1 with the adapter having the optical assembly of Embodiment 1. With the objective lens system of Table 1 coupled to the adaptor optical system of Embodiment 1, the resultant angle of view is $2\omega = 26°$. In other words, a lens system is obtained which has been corrected for aberrations up to an image height of $y' = 16$.

When the prior art adaptor of FIG. 1 is employed, $Y' = 16$ corresponds to $2\omega = 18°$ for the lens system of Table 1. Thus, only this limited angle of view is the maximum utilizable angle by the optical device. In contrast, when an adaptor having the lens assembly of Embodiment 1 is employed, an objective lens system already corrected up to $2\omega = 46°$ can be effectively utilized. Furthermore, because $\beta = 0.7$ for the lens assembly of Embodiment 1, the overall F-number is $F = 1.0$ when the adaptor is mounted on an objective lens having an F-number of $F = 1.4$. Thus, the use of the adaptor of Embodiment 1 provides a lens system having a larger aperture ratio. Other embodiments of this invention will be given hereinafter.

TABLE 3

Embodiment 2 ($\beta = 0.7$)

| | Radius of Curvature | Axial Distance | Refractive Index | Abbe Number |
|---|---|---|---|---|
| | | $d_0 = 9.1$ | | |
| I | $r_{c1} = -120.33$ | | | |
| | | $d_{c1} = 2.92$ | $n_{c1} = 1.62588$ | $\nu_{c1} = 35.7$ |
| | $r_{c2} = 73.791$ | | | |
| | | $d_{c2} = 7.78$ | $n_{c2} = 1.7435$ | $\nu_{c2} = 49.2$ |
| | $r_{c3} = 335.48$ | | | |
| | | $d_{c3} = 0.39$ | | |
| II | $r_{c4} = 58.734$ | | | |
| | | $d_{c4} = 10.7$ | $n_{c3} = 1.713$ | $\nu_{c3} = 53.9$ |
| | $r_{c5} = -434.76$ | | | |

TABLE 4

Embodiment 3 ($\beta = 0.7$)

| | Radius of Curvature | Axial Distance | Refractive Index | Abbe Number |
|---|---|---|---|---|
| | | $d_0 = 9.1$ | | |
| I | $r_{c1} = -92.335$ | | | |
| | | $d_{c1} = 3.89$ | $n_{c1} = 1.70055$ | $\nu_{c1} = 30.1$ |
| | $r_{c2} = -402.12$ | | | |
| | | $d_{c2} = 0.39$ | | |
| | $r_{c3} = 68.184$ | | | |
| | | $d_{c3} = 11.67$ | $n_{c2} = 1.713$ | $\nu_{c2} = 53.9$ |
| II | $r_{c4} = -69.157$ | | | |
| | | $d_{c4} = 2.92$ | $n_{c3} = 1.62588$ | $\nu_{c3} = 35.7$ |
| | $r_{c5} = -357.28$ | | | |

TABLE 5

Embodiment 4 ($\beta = 0.7$)

| | Radius of Curvature | Axial Distance | Refractive Index | Abbe Number |
|---|---|---|---|---|
| | | $d_0 = 9.1$ | | |
| I | $r_{c1} = -96.477$ | | | |
| | | $d_{c1} = 3.89$ | $n_{c1} = 1.70055$ | $\nu_{c1} = 30.1$ |
| | $r_{c2} = 599.4$ | | | |
| | | $d_{c2} = 0.39$ | | |
| | $r_{c3} = 71.235$ | | | |
| | | $d_{c3} = 7.78$ | $n_{c2} = 1.713$ | $\nu_{c2} = 53.9$ |
| II | $r_{c4} = -362.81$ | | | |
| | | $d_{c4} = 0.39$ | | |
| | $r_{c5} = 176.55$ | | | |
| | | $d_{c5} = 7.78$ | $n_{c3} = 1.713$ | $\nu_{c3} = 53.9$ |
| | $r_{c6} = \infty$ | | | |

Figure 5:
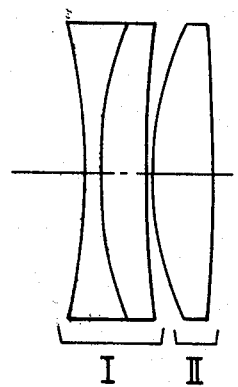
FIG. 5 is an alternative sectional schematic view of an adaptor lens system of another embodiment of the present invention.
Figure 7:
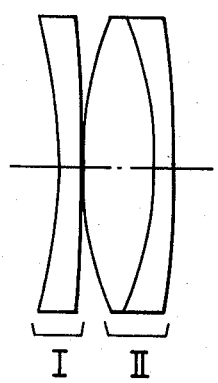
FIG. 7 is still another alternative embodiment of an adaptor lens system of the present invention.
Figure 6:
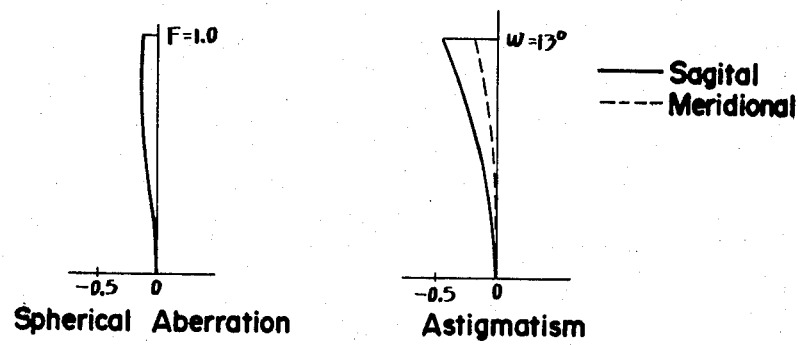
FIG. 6 is a graphical plot of the spherical aberration and astigmatism of the embodiment of FIG. 5.
Figure 8:
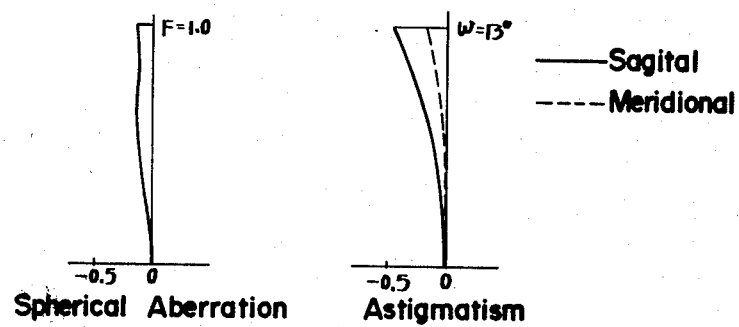
FIG. 8 is a graphical plot of the spherical aberration astigmatism of the embodiment of FIG. 7.
Figure 9:
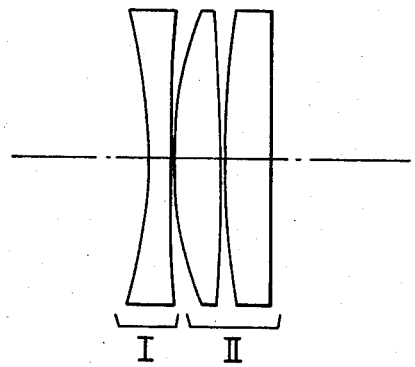
FIG. 9 is a final alternative embodiment of an adaptor lens system of the present invention.
Figure 10:
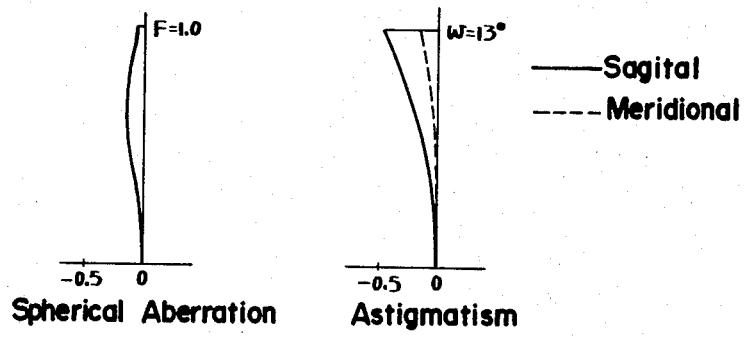
FIG. 10 is a graphical plot of the spherical aberration and astigmatism of the embodiment of FIG. 9.

The constructions of Embodiments 2 through 4 are shown in FIGS. 5, 7 and 9, respectively. FIGS. 6, 8 and 10 disclose the aberration diagrams of the combinations of the objective lens of Table 1 with each of these several Embodiments, respectively.

While, in Embodiments 1 through 4, the relay magnification $\beta$ of the lens assembly in each adaptor is shown as 0.7, the relay magnification $\beta$ is not limited to 0.7 but the beneficial results of this invention may still be obtained when $\beta$ is less than 1, e.g. $\beta = 0.8$ or $\beta = 0.6$.

It will be apparent from the above description that because, in accordance with this invention, the focal length of the objective lens is shortened upon mounting of the optical adaptor, it is not only possible to use most of the original performance of the objective lens but it is also possible to obtain a lens system having a reduced F-number, i.e. a greater aperture ratio. The principal points and the focal length of the adaptor lens system of the present invention has been determined to shift the image plane towards the object side upon mounting of the optical adaptor.

In addition, a lens back focal length of any necessary length can be obtained by constructing the lens system within the adaptor of two groups, negative and positive in the order mentioned from the object side.

Furthermore, adherence to the aforementioned conditions for aberration correction permits utilization of a completely compensated objective lens in combination with the optical adaptor of this invention without any disturbance of the pre-established aberration balance and further with satisfactory correction for each of various aberrations.

It is to be further understood that various modifications of the generic concepts of this invention are possible without departing from its spirit and accordingly the scope of the present invention should be determined solely from the following claims.

What is claimed is:

1. An optical adaptor for permitting objective lenses of a predetermined aperture ratio and focal length designated for a specific picture size to be used on picture taking optical devices of a smaller picture size design, such as television cameras and movie cameras, comprising;
    an adaptor housing having a first mounting member capable of attachment to each one of said objective lenses and a second mounting member capable of attachment to each one of said picture taking optical devices; and
    an adaptor lens system of a positive refractive power for converting the focal length and aperture ratio of the attached objective lens into a respectively shorter focal length and greater aperture ratio, said adaptor lens system including a first lens group of negative refractive power and a second lens group of positive refractive power and said first and second lens groups being located sequentially from the object to the image side of said adapter lens system, the principal points and the focal length of said adaptor lens system being predetermined to shift the image plane of each of said objective lenses towards the object side when said first mounting member is attached to each of said objective lenses.

2. An optical adaptor as defined in claim 1, wherein said first lens group has a front surface concave to the object side and wherein said second lens group has a front surface convex to the object side.

3. An optical adaptor as defined in claim 2, wherein the following conditions are satisfied:

$$(4/\beta)-4.5 \leq |\Psi_2/\Psi_1| \leq (4/\beta)-3 \quad (1)$$

$$\beta \leq 1 \quad (2)$$

wherein $\Psi_1$ and $\Psi_2$ represent the refractive powers of said first and second lens groups respectively and $\beta$ represents the relay magnification of said lens system.

4. An optical adaptor as defined in claim 3, wherein the average value of the Abbe number of said first lens group is smaller than or equal to that of said second lens group.

5. An optical adaptor as defined in claim 1, wherein said first and second mounting members are different in type from one another whereby said adaptor also serves as a mount conversion adaptor.

6. In a video or motion picture camera using interchangeable objective lenses having a predetermined optical design for interfacing with a 35 mm single lens reflex camera of a larger image format than the video or motion picture camera image format, the predetermined optical design including a focal length and aperture ratio, the improvement comprising an optical adaptor including;
    an adaptor housing having a first mounting member attached to a 35 mm single lens reflex objective lens system and a second mounting member attached to one of the video and motion picture cameras, and
    an adaptor lens system having a first and second lens element capable of converting the predetermined optical design focal length and aperture ratio of the objective lens into a respectively shorter focal length and greater aperture ratio wherein the following conditions are satisfied;

$$(4/\beta)-4.5 \leq |\Psi_2/\Psi_1| \leq (4/\beta)-3$$

wherein $\Psi_1$ and $\Psi_2$ represent the refractive powers of the first and second lens elements respectively and $\beta$ represents relay magnification of the adaptor lens system.

7. The invention of claim 6 wherein the relay magnification ratio $\beta$ satisfies the following;

$$\beta \leq 1$$

8. The invention of claim 7 wherein the average value of the Abbe number of the first lens element is smaller than or equal to that of the Abbe number of the second lens element.

9. The invention of claim 8 wherein the first lens element has a front surface concave to the object side and the second lens element has a front surface convex to the object side.

* * * * *